US012287071B2

(12) United States Patent
Zhong

(10) Patent No.: US 12,287,071 B2
(45) Date of Patent: Apr. 29, 2025

(54) TACTICAL FLASHLIGHT WITH CAMERA FUNCTION

(71) Applicant: Xingfang Zhong, Shenzhen (CN)

(72) Inventor: Xingfang Zhong, Shenzhen (CN)

( * ) Notice: Subject to any disclaimer, the term of this patent is extended or adjusted under 35 U.S.C. 154(b) by 0 days.

(21) Appl. No.: 18/960,193

(22) Filed: Nov. 26, 2024

(65) Prior Publication Data

US 2025/0084970 A1 Mar. 13, 2025

(51) Int. Cl.

| | |
|---|---|
| ***F21L 4/02*** | (2006.01) |
| ***F21V 21/14*** | (2006.01) |
| ***F21V 23/04*** | (2006.01) |
| ***F21V 31/00*** | (2006.01) |
| ***F21V 33/00*** | (2006.01) |
| ***F21Y 113/00*** | (2016.01) |
| ***F21Y 115/10*** | (2016.01) |

(52) U.S. Cl.
CPC .............. *F21L 4/02* (2013.01); *F21V 21/145* (2013.01); *F21V 23/04* (2013.01); *F21V 31/005* (2013.01); *F21V 33/0052* (2013.01); *F21Y 2113/00* (2013.01); *F21Y 2115/10* (2016.08)

(58) Field of Classification Search
CPC .......... F21L 4/02; F21V 21/145; F21V 23/04; F21V 31/005; F21V 33/0052; F21Y 2113/00; F21Y 2115/10
See application file for complete search history.

(56) References Cited

U.S. PATENT DOCUMENTS

| | | | | |
|---|---|---|---|---|
| 4,063,258 | A * | 12/1977 | Allen | G03B 15/035 396/419 |
| 5,305,033 | A * | 4/1994 | Takahashi | G03B 15/035 396/176 |
| 7,581,852 | B2 * | 9/2009 | Kennedy | F21V 33/0052 362/253 |
| 11,306,987 | B2 * | 4/2022 | Hedeen | F41C 27/00 |
| 2004/0201989 | A1 * | 10/2004 | Raskas | H04N 5/772 348/E5.029 |
| 2006/0171700 | A1 * | 8/2006 | Yang | G03B 15/03 396/155 |
| 2018/0094900 | A1 * | 4/2018 | Sharrah | F41G 1/545 |
| 2018/0188004 | A1 * | 7/2018 | Zhang | H04N 23/635 |
| 2021/0348886 | A1 * | 11/2021 | Havens | F41G 1/473 |

FOREIGN PATENT DOCUMENTS

CN 217403262 U * 9/2022

* cited by examiner

*Primary Examiner* — Tsion Tumebo
(74) *Attorney, Agent, or Firm* — Daniel M. Cohn; Howard M. Cohn

(57) ABSTRACT

The invention discloses a tactical flashlight with camera function, which comprises a flashlight component, wherein the flashlight component comprises a main shell, a lamp component and a camera component located above the lamp component are arranged inside the main shell, the lamp component comprises a lamp panel and LEDs arranged on one side of the lamp panel, a lamp cup for covering the LEDs is also arranged on one side of the lamp panel, and the camera component comprises a lens mount. The camera function is integrated into the flashlight with laser aiming function, the flashlight is installed on outdoor equipment to record the situation in front of the flashlight as well as the actions of holding gun for self-defense and go hunting in real time, buttons are located at the tail of the main shell, and a storage slot is used to store a buckle.

2 Claims, 7 Drawing Sheets

TACTICAL FLASHLIGHT WITH CAMERA FUNCTION

TECHNICAL FIELD

The invention relates to the technical field of flashlights, in particular to a tactical flashlight with camera function.

BACKGROUND ART

Flashlight is a handheld electronic lighting tool. A typical flashlight is provided with a battery-powered bulb and a focusing mirror as well as a handheld shell for hand-held use. The flashlight is an indispensable part of outdoor equipment, but the existing outdoor flashlight still has the following shortcomings during use: the flashlight is a commonly used lighting apparatus on the outdoor equipment, and provides very dazzling light for night travel and hunting; the tactical flashlight design is similar to the lighting function of the common flashlight, providing brightness with different lumens and lighting ahead; the existing tactical flashlight only has the functions of lighting and laser aiming, and the use effect is not ideal.

SUMMARY OF THE INVENTION

To achieve the above purpose, the invention provides the following technical proposal: a tactical flashlight with camera function comprises a flashlight component, wherein the flashlight component comprises a main shell, a lamp component and a camera component located above the lamp component are arranged inside the main shell; The lamp component comprises a lamp panel and LEDs arranged on one side of the lamp panel, and a lamp cup for covering the LEDs is also arranged on one side of the lamp panel;

The camera component comprises a lens mount, and a camera body is arranged inside the lens mount.

As a preferred technical proposal of the invention, the tactical flashlight also comprise a laser component, wherein the laser component comprises an emitter bracket, a laser emitter body is arranged inside the emitter bracket, one end of the laser emitter body runs through the lamp panel and extends to the interior of the lamp cup, an emitter rear shell is arranged at one end of the laser emitter body, a fixing sleeve sleeved with the surface of the laser emitter body is arranged inside the emitter bracket, a vertical adjusting piece and a horizontal adjusting piece are respectively arranged at the top and one side of the emitter rear shell, the top end of the vertical adjusting piece extends to the top of the main shell, and the end of the horizontal adjusting piece extends to the side of the main shell.

As a preferred technical proposal of the invention, a gasket is also arranged between the lamp panel and the lamp cup, a through hole sleeved with one end of the laser emitter body is arranged inside the lamp cup, a lens is arranged inside one end of the lamp cup, and a lens frame is arranged at one end of the lamp cup.

As a preferred technical proposal of the invention, the camera component also comprises a lens front arranged outside the lens mount and the camera body, and a lens frame is also sleeved outside one end of the camera body.

As a preferred technical proposal of the invention, a mounting cylinder A is arranged at one end of the main shell, the lamp component is installed inside the mounting cylinder A, a mounting cylinder B is arranged at the top of the main shell, and the camera component is installed inside the mounting cylinder B.

As a preferred technical proposal of the invention, a clamping component is arranged at the bottom of the main shell, a clamping rail A is fixedly arranged at the bottom of one side of the main shell, the clamping component comprises a clamping rail B, a limit screw, a toothed block and a toothed plate, the clamping rail B is opposite to the clamping rail A, one end of the limit screw extends to the interior of the clamping rail B, the other end thereof runs through the toothed block and is provided with a buckle, the toothed plate is fixedly arranged at the bottom of the main shell and is meshed with the teethed block, the clamping rail B is movably arranged at the bottom of one side of the main shell, a cam head is arranged at one end of the buckle, and one end of the limit screw rod is movably hinged with the interior of the cam head.

As a preferred technical proposal of the invention, a storage slot located above the clamping rail A is arranged at the bottom of one side of the main shell, the buckle is movably arranged inside the storage slot, stabilizer rods with one end extending to the inside of the main shell are arranged on one side of the clamping rail B, and at least one stabilizer rod is arranged.

As a preferred technical proposal of the invention, a tail buckle is arranged on one side of the main shell, a switch control board is arranged inside the tail buckle, at least two buttons are symmetrically arranged inside the tail buckle, a main control board located on one side of the switch control board is arranged inside the main shell, a battery located below the laser component is arranged inside the main shell, a silicone mold is arranged on one side of the switch control board, the buttons are hinged to the interior of the tail buckle 16 through a torsional spring, and a tail cover is arranged on one side of the tail buckle away from the main shell.

As a preferred technical proposal of the invention, a toggle switch located above the tail cover is arranged on one side of the tail buckle away from the main shell, and one end of the buttons runs through the tail cover 164 and is provided with a sheath.

As a preferred technical proposal of the invention, a charging interface with one end extending to one side of the main shell and a chip board with one end connected with the lens mount are arranged on one side of the main control board, a waterproof silicone plug for covering the charging interface is arranged on one side of the main shell, a waterproof silicone pad is also arranged between the main shell and the tail buckle, the main control board is electrically connected with the battery, and a MIC microphone and a TF memory card slot are also integrated on the main control board.

Compared with the prior art, the invention provides a tactical flashlight with camera function, which has the following beneficial effects:

The tactical flashlight with camera function integrates the camera function into the flashlight with the laser aiming function, and is installed on the outdoor equipment to record the situation in front of the flashlight as well as the actions of holding gun for self-defense and going hunting in real time, greatly improving the versatility of the tactical flashlight; the buttons are located at the tail of the main shell, being more convenient and faster to activate the camera component and the laser component; the storage slot is used to store the buckle, ensuring the appearance of the product, greatly reducing the situation of spurious triggering of the buckle, and being safer to use.

Figure 1:
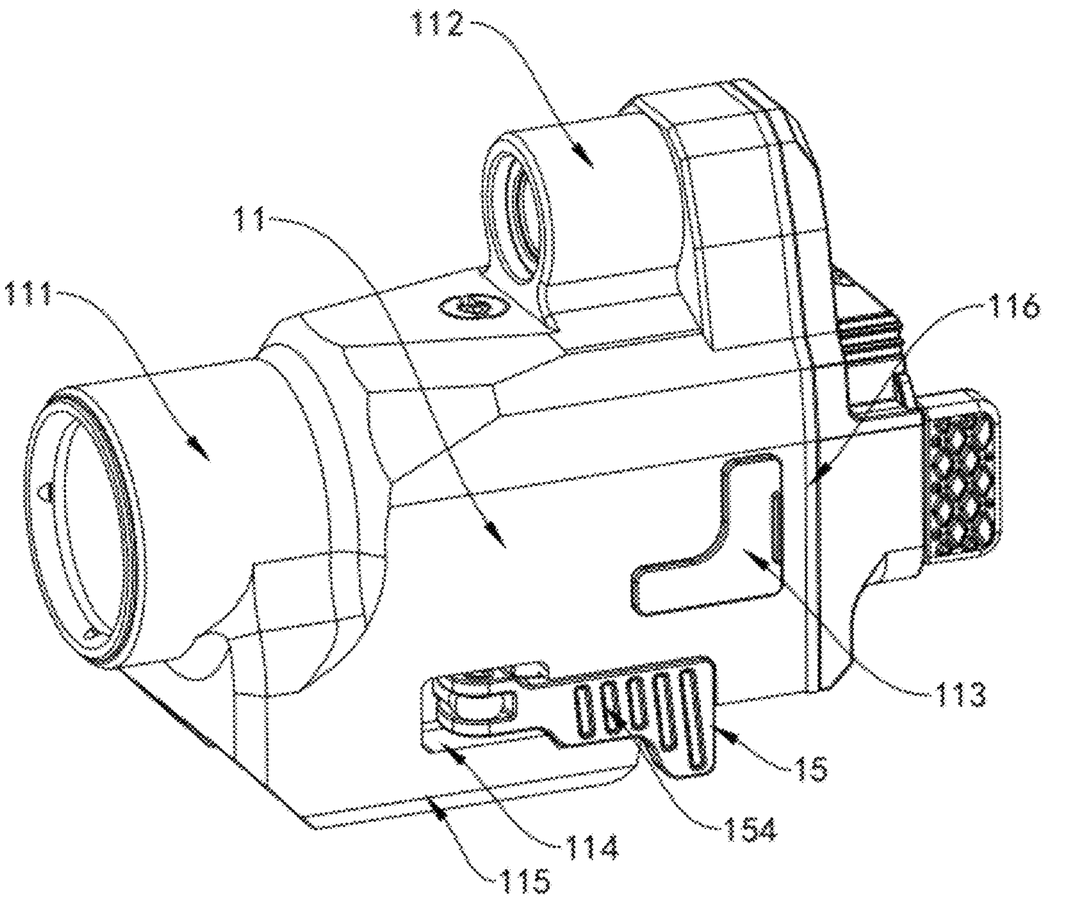
FIG. 1 is the structural diagram for a tactical flashlight with camera function in the invention.

In the drawings: 1. Flashlight component; 11. Main shell; 111. Mounting cylinder A; 112. Mounting cylinder B; 113. Waterproof silicone plug; 114. Storage slot; 115. Clamping rail A; 116. Waterproof silicone pad; 12. Lamp component; 121. Lamp panel; 122. LED; 123. Gasket; 124. Lamp cup; 125. Lens; 126. Lense frame; 127. Through hole; 13. Laser module; 131. Emitter bracket; 132. Fixing sleeve; 133. Laser emitter body; 134. Emitter rear shell; 135. Vertical adjusting piece; 136. Horizontal adjusting piece; 14. Camera component; 141. Lens mount; 142. Camera body; 143. Lens front; 144. Lens frame; 15. Clamping component; 151. Clamping rail B; 152. Limit screw; 153. Toothed block; 154. Buckle; 155. Toothed plate; 156. Cam head; 157. Stabilizer rod; 16. Tail buckle; 161. Silicone mold; 162. Torsional spring; 163. Button; 164. Tail cover; 165. Sheath; 166. Switch control board; 17. Main control board; 171. Charging interface; 172. Chip board; 18. Battery; 19. Toggle switch.

DETAILED DESCRIPTION OF THE INVENTION

For a more detailed understanding of the characteristics and technical content of the embodiments in the disclosure, the realization of the embodiments in the disclosure is described in detail in combination with the drawings. The drawings are for reference only, but not used to limit the embodiments in the disclosure. In the following technical description, for ease of explanation, a number of details are provided to fully understand the disclosed embodiments. However, in the absence of these details, one or more embodiments may still be implemented. In other cases, familiar structures and devices may be shown to simplify the drawings.

The terms such as "first" and "second" in the specification and claims of the disclosure and in the drawings above are used to distinguish similar objects and are not necessarily used to describe a particular order or sequence. Understandably, the data used are interchangeable where appropriate for the purposes of embodiments of the disclosure described herein. Furthermore, the terms "comprise" and "have", and any variation thereof, are intended to cover non-exclusive inclusion.

In the embodiments of the disclosure, the orientation or position relationships indicated by the terms such as "upper", "lower", "inside", "middle", "outside", "front" and "rear" are based on the orientation or position relationships shown in the drawings. These terms are primarily intended to better describe the embodiments of the disclosure and its embodiments and are not intended to specify that the indicated device, element or component must have a particular orientation or be constructed and operated in a particular orientation. Moreover, some of the above terms may be used to indicate other meanings in addition to orientation or position relations, for example, the term "upper" may also be used in some cases to indicate a dependency or connection relationship. The ordinary technicians in the field may understand the specific meanings of these terms in the embodiments of the disclosure as the case may be.

In addition, the terms "arranged", "connected" and "fixed" should be understood in a broad sense. For example, "connected" can be fixedly connected, detachably connected or integrally constructed; it can be mechanically connected or electrically connected; it can be directly connected, or indirectly connected through an intermediate medium, or internally connected between two devices, elements or components. The ordinary technicians in the field may understand the specific meanings of the above terms in the embodiments of the disclosure as the case may be.

Unless otherwise stated, the term "a plurality of" means two or more.

It should be noted that the embodiments in the disclosure and the features in the embodiments may be combined with each other without conflict.

Figure 2:
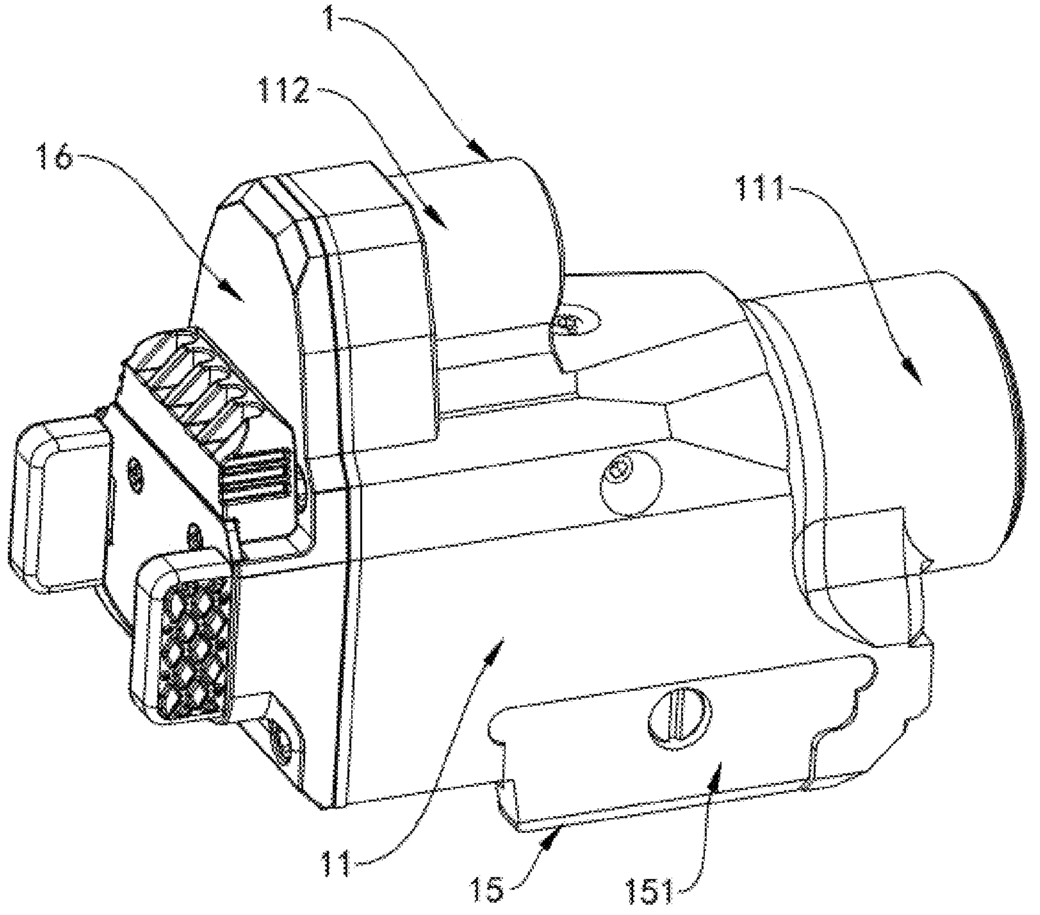
FIG. 2 is the structural side view for a tactical flashlight with camera function in the invention.
Figure 3:
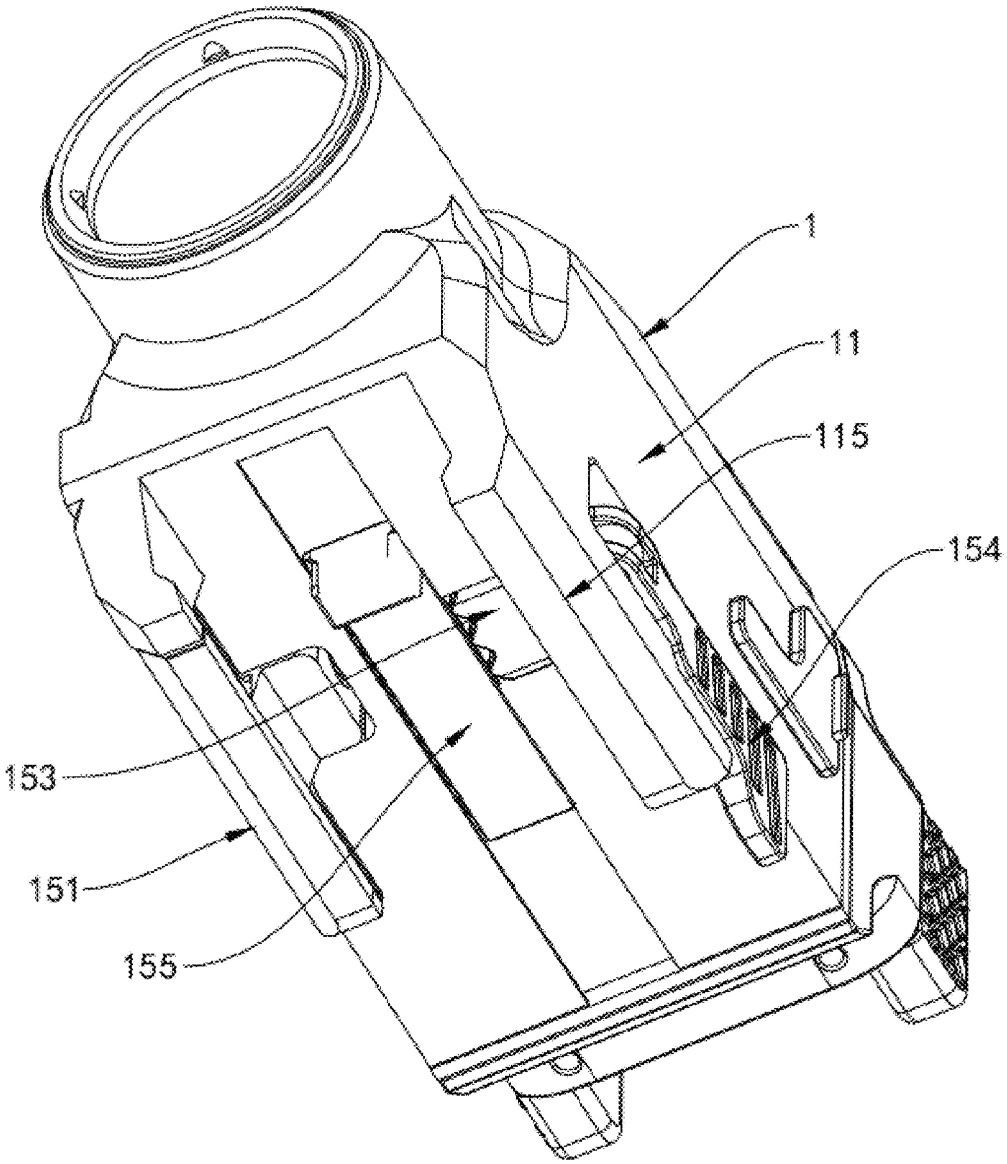
FIG. 3 is the schematic diagram for a bottom structure of a main shell of a tactical flashlight with camera function in the invention.
Figure 4:
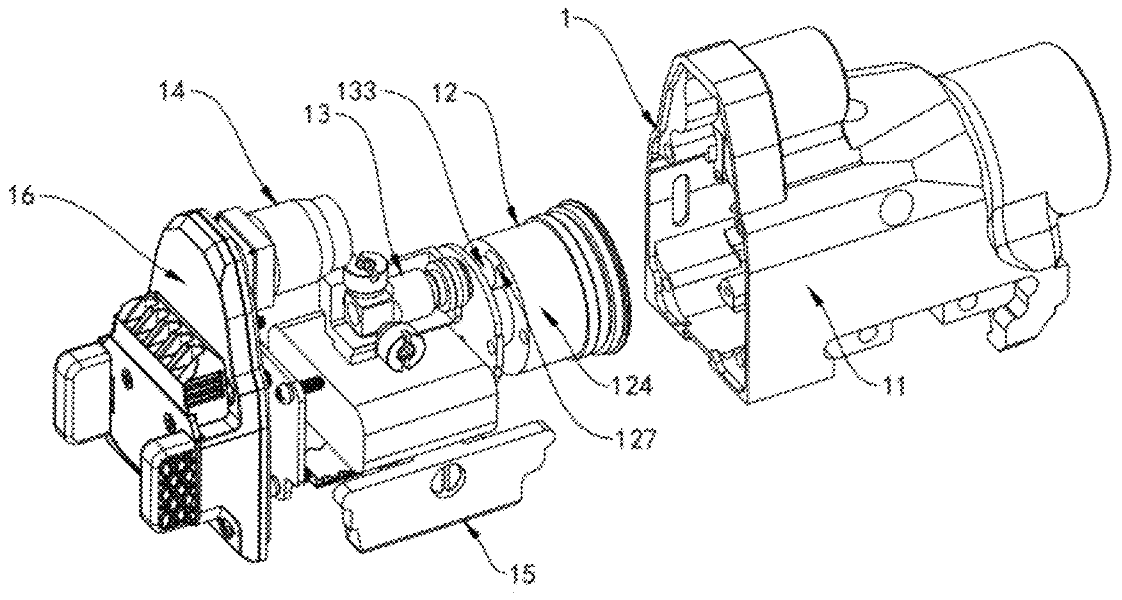
FIG. 4 is the schematic diagram for an internal structure of a main shell of a tactical flashlight with camera function in the invention.
Figure 5:
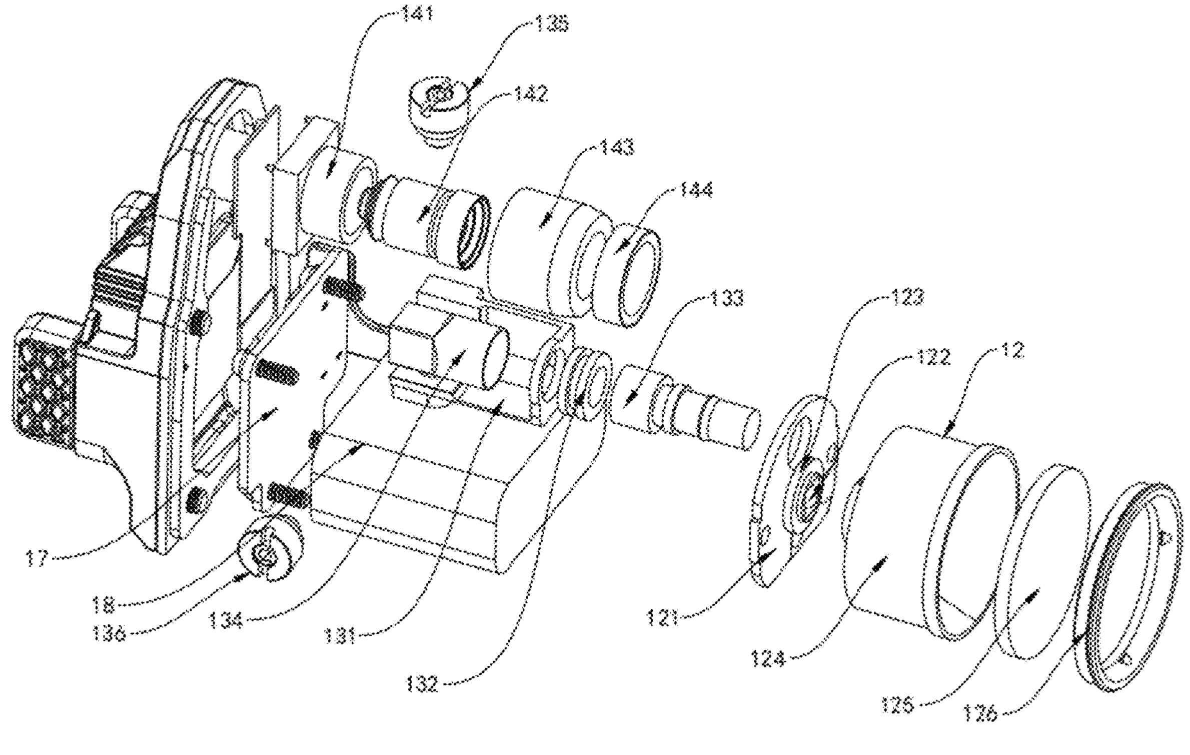
FIG. 5 is the structure explosive view for a lamp component, a laser component and a camera component of a tactical flashlight with camera function in the invention.
Figure 6:
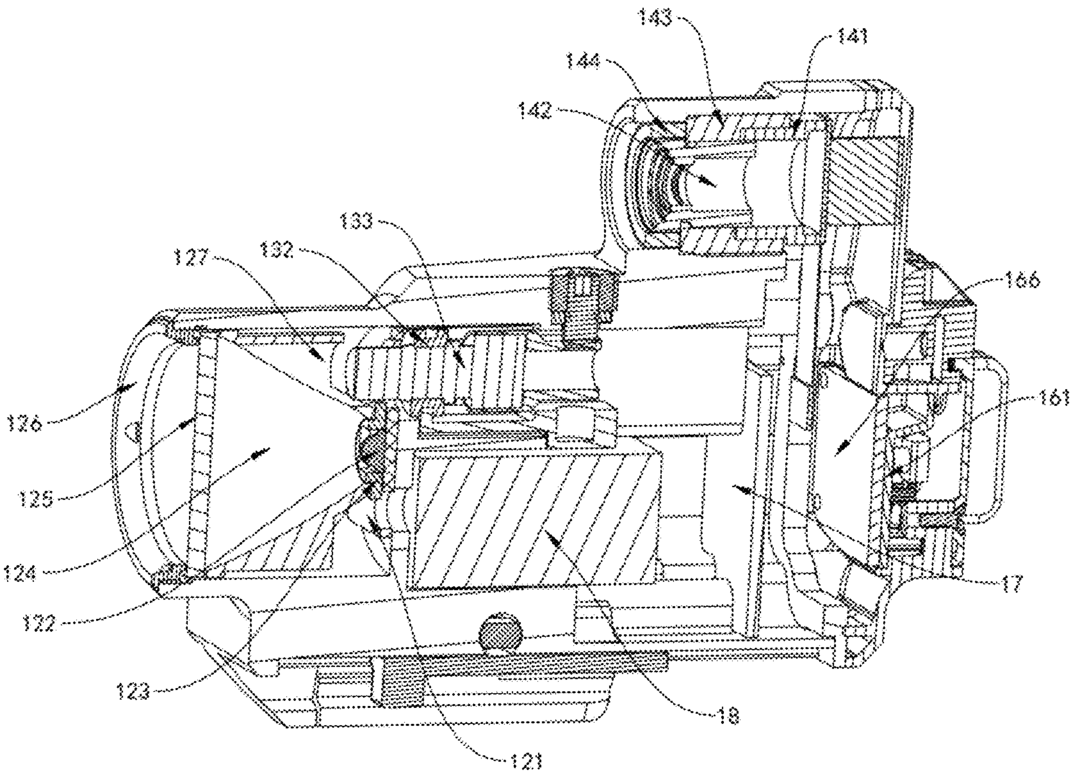
FIG. 6 is the cross-section view for a main shell structure of a tactical flashlight with camera function in the invention.
Figure 7:
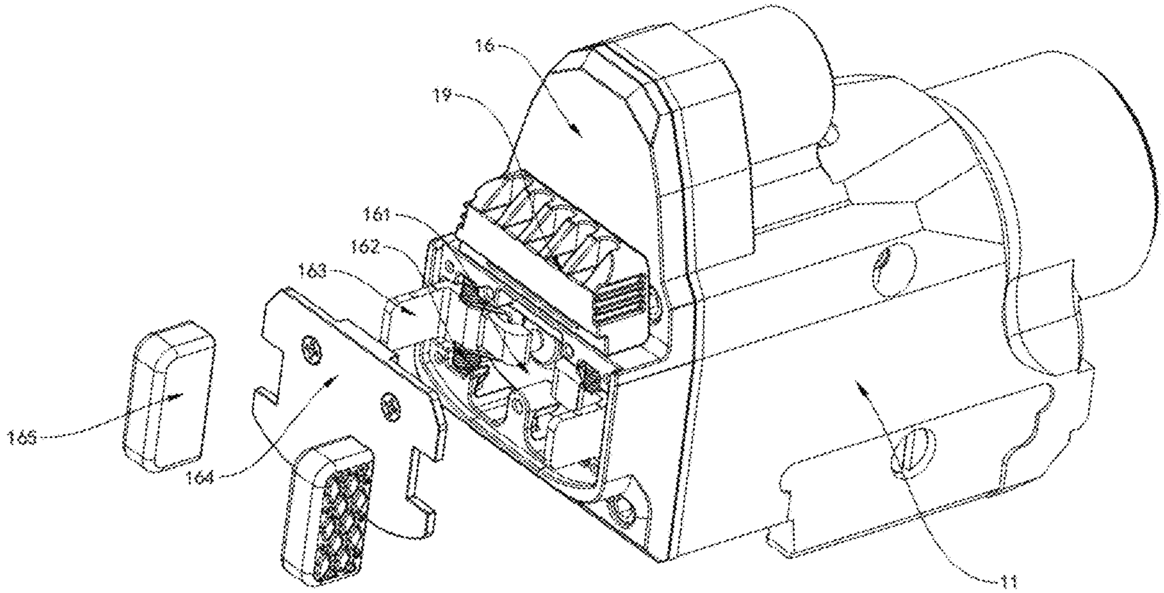
FIG. 7 is the schematic diagram for an internal structure of a tail buckle of a tactical flashlight with camera function in the invention.
Figure 8:
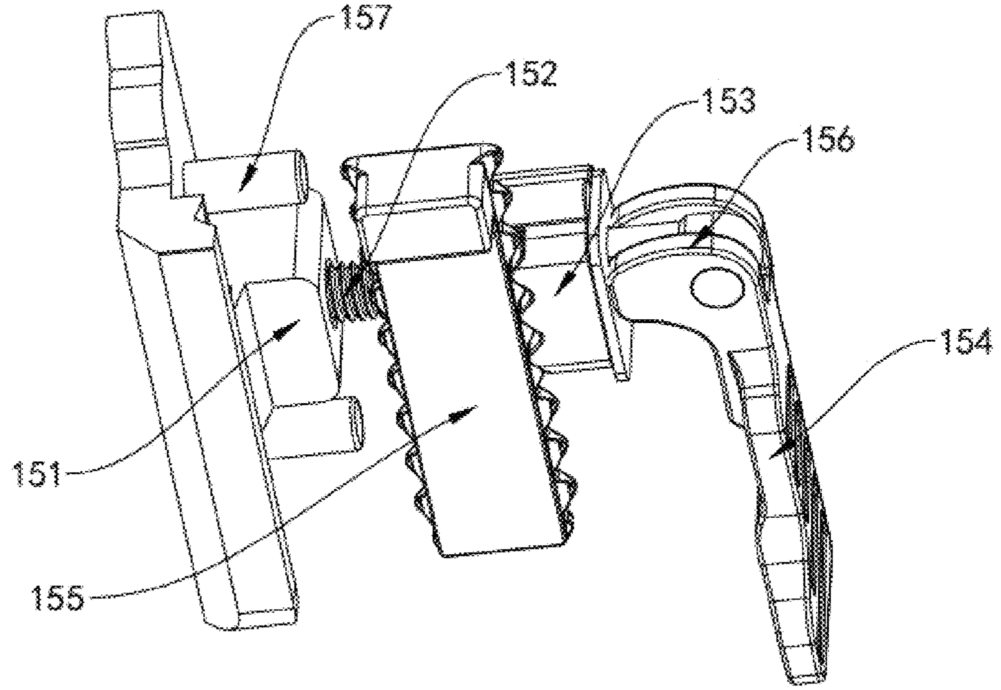
FIG. 8 is the structural diagram for a clamping component of a tactical flashlight with camera function in the invention.
Figure 9:
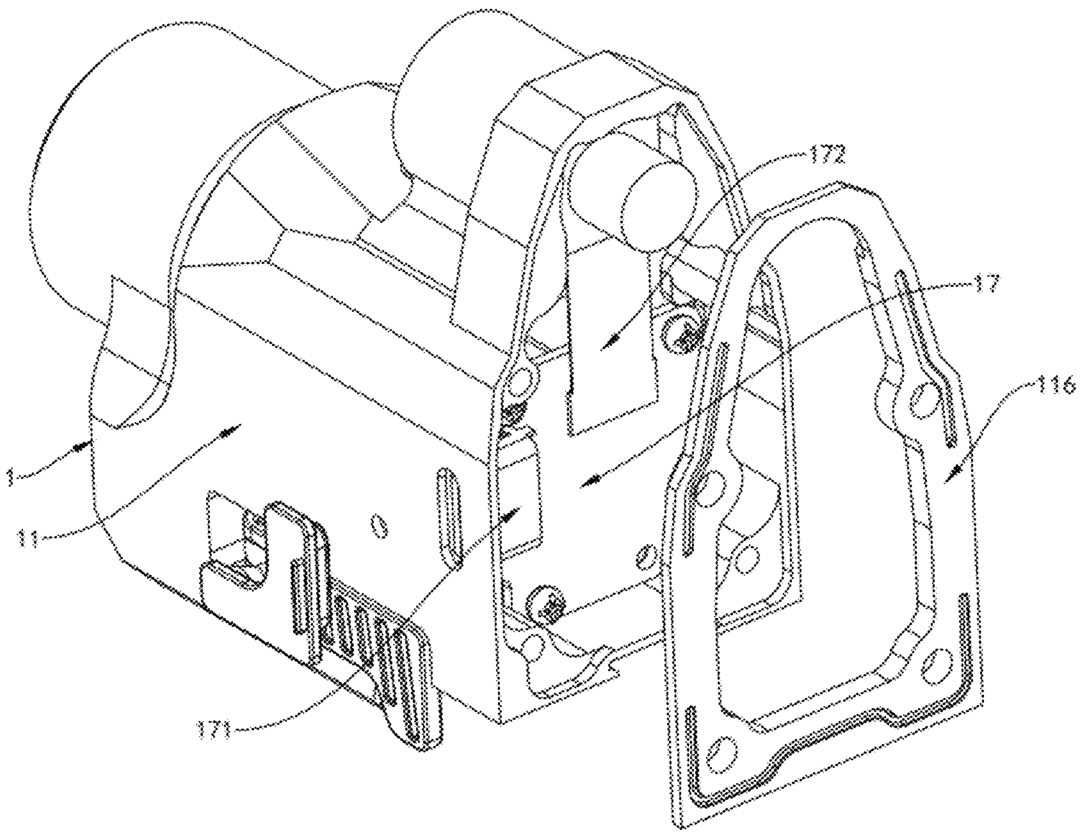
FIG. 9 is the structural diagram for a main control board of a tactical flashlight with camera function in the invention.

As shown in FIG. 1 to FIG. 9, a tactical flashlight with camera function comprises a flashlight component 1, wherein the flashlight component 1 comprises a main shell 11, a lamp component 12 and a camera component 14 located above the lamp component 12 are arranged inside the main shell 11.

The lamp component 12 comprises a lamp panel 121 and LEDs 122 arranged on one side of the lamp panel 121, and a lamp cup 124 for covering the LEDs 122 is also arranged on one side of the lamp panel 121.

The camera component 14 comprises a lens mount 141, and a camera body 142 is arranged inside the lens mount 141.

The camera function is integrated into the flashlight with laser aiming function, the flashlight is installed on outdoor equipment to record the situation in front of the flashlight, the actions of holding gun for self-defense, going hunting and trailing fugitives and evidence of self-defense in real time, greatly improving the versatility of the tactical flashlight; buttons 163 are located at the tail of the main shell 11, being more convenient and faster to activate the camera component 14 and the laser component 13; a storage slot 114 is used to store a buckle 154, ensuring the appearance of the product, greatly reducing the situation of spurious triggering of the buckle 154, and being safer to use.

As a specific technical proposal of the embodiment, the tactical flashlight also comprise a laser component 13, wherein the laser component 13 is located above the lamp component 12 and comprises an emitter bracket 131, a laser emitter body 133 is arranged inside the emitter bracket 131, one end of the laser emitter body 133 runs through the lamp panel 121 and extends to the interior of the lamp cup 124, an emitter rear shell 134 is arranged at one end of the laser emitter body 133, a fixing sleeve 132 sleeved with the surface of the laser emitter body 133 is arranged inside the emitter bracket 131, a vertical adjusting piece 135 and a horizontal adjusting piece 136 are respectively arranged at the top and one side of the emitter rear shell 134, the top end of the vertical adjusting piece 135 extends to the top of the main shell 11, and the end of the horizontal adjusting piece 136 extends to the side of the main shell 11; the aiming direction of the laser emitter body 133 can be adjusted through the vertical adjusting piece 135 and the horizontal adjusting piece 136, the laser emitter body 133 can be the emitter in the form of emitting laser rays or points to increase the auxiliary laser rays or laser aiming points on the field of view, thereby aiming the target more quickly, improving the hit rate during outdoor hunting and hitting objects who defend.

As a specific technical proposal of the embodiment, a gasket 123 is also arranged between the lamp panel 121 and the lamp cup 124, a through hole 127 sleeved with one end of the laser emitter body 133 is arranged inside the lamp cup 124, a lens 125 is arranged inside one end of the lamp cup 124, and a lens frame 126 is arranged at one end of the lamp cup 124; the lamp panel 121 can be controlled through the toggle switch 19 to turn on the LEDs 122, the lamp cup 124 can reflect the light to achieve a wide range of lighting, the through hole 127 ensures that the laser of the laser emitter body 133 can penetrate through the lens 125 to the outside of the main shell 11, and the main shell 11 and the lamp panel 121 are made of aluminum alloy with high strength and light weight, so that the outdoor use effect is better.

As a specific technical proposal of the embodiment, the camera component 14 also comprises a lens front 143 arranged outside the lens mount 141 and the camera body 142, a lens frame 144 is also sleeved outside one end of the camera body 142, the lens mount 141 is used to connect the camera body 142 and the chip board 172, and the lens front 143 is used to fix the camera body 142 and the lens mount 141.

As a specific technical proposal of the embodiment, a mounting cylinder A 111 is arranged at one end of the main shell 11, the lamp component 12 is installed inside the mounting cylinder A 111, a mounting cylinder B 112 is arranged at the top of the main shell 11, and the camera component 14 is installed inside the mounting cylinder B 112; the mounting cylinder B 112 is located above the mounting cylinder A 111, the position design is clever, and the mounting cylinder B 112 is not susceptible to damage caused by collision.

As a specific technical proposal of the embodiment, a clamping component 15 is arranged at the bottom of the main shell 11, a clamping rail A 115 is fixedly arranged at the bottom of one side of the main shell 11, the clamping component 15 comprises a clamping rail B 151, a limit screw 152, a toothed block 153 and a toothed plate 155, the clamping rail B 151 is opposite to the clamping rail A 115, one end of the limit screw 152 extends to the interior of the clamping rail B 151, the other end thereof runs through the toothed block 153 and is provided with a buckle 154, the toothed plate 155 is fixedly arranged at the bottom of the main shell 11 and is meshed with the teethed block 153, the clamping rail B 151 is movably arranged at the bottom of one side of the main shell 11, a cam head 156 is arranged at one end of the buckle 154, and one end of the limit screw 152 rod is movably hinged with the interior of the cam head 156; when the user turns out the buckle 154 from the inside of the storage slot 114, the position near the circle of the cam head 156 is in contact with the toothed block 153, so that the cam head 156 and the toothed block 153 directly have a movable space; the limit screw 152 is pushed through the cam head 156 and drives the clamping rail B 151 to move away from the clamping rail A 115, and then the cam head 156 can be clamped on the outdoor equipment through the clamping rail A 115 and the clamping rail B 151; after clamping, the user turns over and stores the buckle 154 inside the storage slot 114; at this time, the convex position on the surface of the cam head 156 is butted with the toothed block 153, so that the cam head 156 drives the limit screw 152 and pulls the clamping rail B 151 to move relative to the clamping rail A 115, thereby realizing clamping with the outdoor equipment.

As a specific technical proposal of the embodiment, a storage slot 114 located above the clamping rail A 115 is arranged at the bottom of one side of the main shell 11, the buckle 154 is movably arranged inside the storage slot 114, stabilizer rods 157 with one end extending to the inside of the main shell 11 are arranged on one side of the clamping rail B 151, and at least one stabilizer rod 157 is arranged; the storage slot 114 is used to store the buckle 154, ensuring the appearance of the product, greatly reducing the situation of spurious triggering of the buckle 154, and being safer to use; the stabilizer bar 157 ensures the stability of the clamping rail B 151 during the translation process.

As a specific technical proposal of the embodiment, a tail buckle 16 is arranged on one side of the main shell 11, a switch control board 166 is arranged inside the tail buckle 16, at least two buttons 163 are symmetrically arranged inside the tail buckle 16, a main control board 17 located on one side of the switch control board 166 is arranged inside the main shell 11, a battery 18 located below the laser component 13 is arranged inside the main shell 11, a silicone mold 161 is arranged on one side of the switch control board 166, the buttons 163 are hinged to the interior of the tail buckle 16 through a torsional spring 162, and a tail cover 164 is arranged on one side of the tail buckle 16 away from the main shell 11; the silicone mold 161 is arranged so that the switch on the switch control board 166 is pressed by pressing the buttons 163 through the silicone mold 161 to avoid damaging the switch; at the same time, the silicone mold 161 has excellent waterproofness to prevent water from entering the switch control board 166.

As a specific technical proposal of the embodiment, a toggle switch 19 located above the tail cover 164 is arranged on one side of the tail buckle 16 away from the main shell 11, one end of the buttons 163 runs through the tail cover 164 and is provided with a sheath 165, the sheath 165 is made of ABS material, being more comfortable to hold; the buttons 163 are pressed through the sheath 165 to compress the torsional spring 162; at the same time, one end of the buttons 163 activates the switch on the switch control board 166 through the silicone mold 161, the two buttons 163 are used to control the camera component 14 and the laser component 13 respectively and are located at the tail of the main shell 11, being more convenient and faster during operation.

As a specific technical proposal of the embodiment, a charging interface 171 with one end extending to one side of the main shell 11 and a chip board 172 with one end connected with the lens mount 141 are arranged on one side of the main control board 17, a waterproof silicone plug 113 for covering the charging interface 171 is arranged on one side of the main shell 11, a waterproof silicone pad 116 is also arranged between the main shell 11 and the tail buckle 16, the main control board 17 is electrically connected with the battery 18, and a MIC microphone and a TF memory card slot are also integrated on the main control board 17; the waterproof silicone pad 116 ensures the sealing between the main shell 11 and the tail buckle 16, a memory chip is integrated on the chip board 172 to store and record, and videos can be directly exported through the charging interface 171; the waterproof silicone plug 113 protects the charging interface 171, avoiding water seepage and dust entering; the battery 18 can be charged through the charging interface 171.

To sum up, the tactical flashlight with camera function integrates the camera function into the flashlight with the laser aiming function, and is installed on the outdoor equipment to record the situation in front of the flashlight as well as the actions of holding gun for self-defense and going hunting in real time, greatly improving the versatility of the tactical flashlight; the buttons 163 are located at the tail of the main shell 11, being more convenient and faster to activate the camera component 14 and the laser component 13; the storage slot 114 is used to store the buckle 154, ensuring the appearance of the product, greatly reducing the situation of spurious triggering of the buckle, and being safer to use.

The embodiments of the disclosure are shown sufficiently in the above description and the drawings so that the technicians in the field can practice them. Other embodiments may include structural changes as well as other changes. Embodiments represent possible changes only. Individual parts and functions are optional unless explicitly required, and the operation sequence can vary. Parts and features of some embodiments may be included in or substituted for parts and features of other embodiments. The embodiments of the disclosure are not limited to the structures described above and shown in the drawings, and may be subject to various modifications and changes within their scope. The scope of the disclosure is limited only by the claims.

The invention claimed is:

1. A tactical flashlight with camera function, comprising:

a flashlight component (1) comprising a main shell (11), a lamp component (12), and a camera component (14) located above the lamp component (12) and arranged inside the main shell (11) wherein the lamp component (12) comprises a lamp panel (121), a plurality of LEDs (122) arranged on one side of the lamp panel (121), and a lamp cup (124) for covering the LEDs (122) arranged on one side of the lamp panel (121); and wherein the camera component (14) comprises a lens mount (141) and a camera body (142) arranged inside the lens mount (141);

a clamping component (15) arranged at the bottom of the main shell (11);

a clamping rail A (115) fixedly arranged at the bottom of one side of the main shell (11) wherein the clamping component (15) comprises a clamping rail B (151), a limit screw (152), a toothed block (153), and a toothed plate (155); wherein the clamping rail B (151) is opposite to the clamping rail A (115); wherein one end of the limit screw (152) extends to the interior of the clamping rail B (151), the other end of the limit screw (152) runs through the toothed block (153), and the limit screw (152) is provided with a buckle (154); wherein the toothed plate (155) is fixedly arranged at the bottom of the main shell (11) and meshed with the teethed block (153); and wherein the clamping rail B (151) is movably arranged at the bottom of one side of the main shell (11); and a cam head (156) arranged at one end of the buckle (154) wherein one end of the limit screw (152) rod is movably hinged with the interior of the cam head (156).

2. The tactical flashlight with camera function of claim 1, further comprising:

a storage slot (114) located above the clamping rail A (115) and arranged at the bottom of one side of the main shell (11) wherein the buckle (154) is movably arranged inside the storage slot (114); and at least one stabilizer rod (157) having one end extending to the inside of the main shell (11), the at least one stabilizer rod (157) arranged on one side of the clamping rail B (151).

* * * * *